(12) United States Patent
Kiler (10) Patent No.: US 8,067,846 B2
(45) Date of Patent: Nov. 29, 2011

(54) AUTOMOTIVE WIND POWERED GENERATOR

(76) Inventor: Timothy W Kiler, Lake Worth, FL (US)

( * ) Notice: Subject to any disclaimer, the term of this patent is extended or adjusted under 35 U.S.C. 154(b) by 321 days.

(21) Appl. No.: 12/283,345

(22) Filed: Sep. 10, 2008

(65) Prior Publication Data

US 2010/0060011 A1   Mar. 11, 2010

(51) Int. Cl.
*F03D 9/00* (2006.01)
(52) U.S. Cl. .......................... 290/44; 290/55
(58) Field of Classification Search ............ 290/44, 290/55; 415/2.1, 4.1, 4.2, 4.3, 4.5, 3.1, 121.3; 180/2.1, 2.2, 165, 65.3, 65.31; 322/1; 416/55
See application file for complete search history.

(56) References Cited

U.S. PATENT DOCUMENTS

| | | | | |
|---|---|---|---|---|
| 3,876,925 A * | 4/1975 | Stoeckert | .......................... | 322/1 |
| 4,168,759 A * | 9/1979 | Hull et al. | ...................... | 180/2.2 |
| 4,424,452 A * | 1/1984 | Francis | ............................ | 290/55 |
| 5,287,004 A * | 2/1994 | Finley | .............................. | 290/55 |
| D374,656 S * | 10/1996 | Richardson | .................. | D13/115 |
| 5,725,062 A * | 3/1998 | Fronek | .......................... | 180/2.2 |
| 5,920,127 A * | 7/1999 | Damron et al. | ................. | 290/44 |
| 6,373,145 B1 * | 4/2002 | Hamrick | .......................... | 290/44 |
| 6,409,467 B1 * | 6/2002 | Gutterman | ...................... | 415/4.3 |
| 6,423,894 B1 * | 7/2002 | Patz et al. | ...................... | 136/244 |
| 6,838,782 B2 * | 1/2005 | Vu | ................................... | 290/55 |
| 6,857,492 B1 * | 2/2005 | Liskey et al. | ................. | 180/165 |
| 7,135,786 B1 * | 11/2006 | Deets | ............................... | 290/55 |
| 7,434,636 B2 * | 10/2008 | Sutherland | ..................... | 180/2.2 |
| 2003/0057707 A1 * | 3/2003 | Wu | ..................................... | 290/55 |
| 2003/0209370 A1 * | 11/2003 | Maberry | .......................... | 180/2.2 |
| 2005/0098361 A1 * | 5/2005 | Mitchell | ......................... | 180/2.2 |
| 2006/0278445 A1 * | 12/2006 | Chang | ............................. | 180/2.2 |
| 2007/0107949 A1 * | 5/2007 | Bradley et al. | ................. | 180/2.2 |
| 2008/0150296 A1 * | 6/2008 | Fein et al. | ...................... | 290/1 R |
| 2008/0202825 A1 * | 8/2008 | Kerish | ............................ | 180/2.2 |

* cited by examiner

*Primary Examiner* — Julio Gonzalez
(74) *Attorney, Agent, or Firm* — Robert C. Kain, Jr.

(57) ABSTRACT

The Wind Powered Generator System is a combination of many common automotive parts. Automotive wind power is a new area and incorporates a roof carrier system that have generators mounted on the crossbar or the roof system. The air velocity or wind turns the fan blade when either vehicle is in motion or not, producing an electrical current.

1 Claim, 8 Drawing Sheets

WIND POWERED GENERATOR SYSTEM

BASIC ROOF CARRIER

WIND POWERED GENERATOR SYSTEM

ANGLE VIEWS OF GENERATOR

FIG.3

FRONT FAN

FIG.5

BASIC ROOF CARRIER

FIG.6

BASIC GENERATOR

FIG. 7

BASIC POWER CONTROL MODULE

FIG.8

BASIC BATTERY OR POWER CELL

AUTOMOTIVE WIND POWERED GENERATOR

FIELD

The present disclosure pertains to an automotive wind powered generator system.

DESCRIPTION OF RELATED ART

Several automotive generators, power control module, battery and or cell unit. All of these components are parts of automotive vehicles.

The above mentioned components provide a power source for generating system provided by a drive belt system. None of these systems incorporate an outer wind power generating system for electric automotive vehicles.

BRIEF DESCRIPTION OF THE FIGURES

The present invention is illustrated by way of existing illustrations of components or parts and by drawings.

DETAILED DESCRIPTION

The following description provides an automotive wind powered generator system. In the following description, numerous specific details are set forth in order to provide a more thorough understanding of the present invention.

The present invention is an electrical re-charging station for hybrid or electric vehicles which contain a battery or electric cell. The purpose is to have an electric producing generator(s) or motor(s) consistently re-charging the battery or cell while the vehicle is in motion or in Park position. A fan blade placed on the rotor shaft or hub of the generator(s) will turn clockwise with the assistance of air velocity, thus producing an electrical current. The benefit is that the generator system will produce an electric current that will increase the possible "Range" of the vehicle. It will also charge enough voltage to reduce the amount for "At Home" charging from utilities.

The components necessary to assemble this system consist of a generator that is GM number 10495386, plastic fan blade that is Electrolux 5308000010, a roof-rack crossbar that is GM number 17801157, a power control unit that is GM number 16217058 and a battery or cell that is GM number 19168294.

Figure 1:
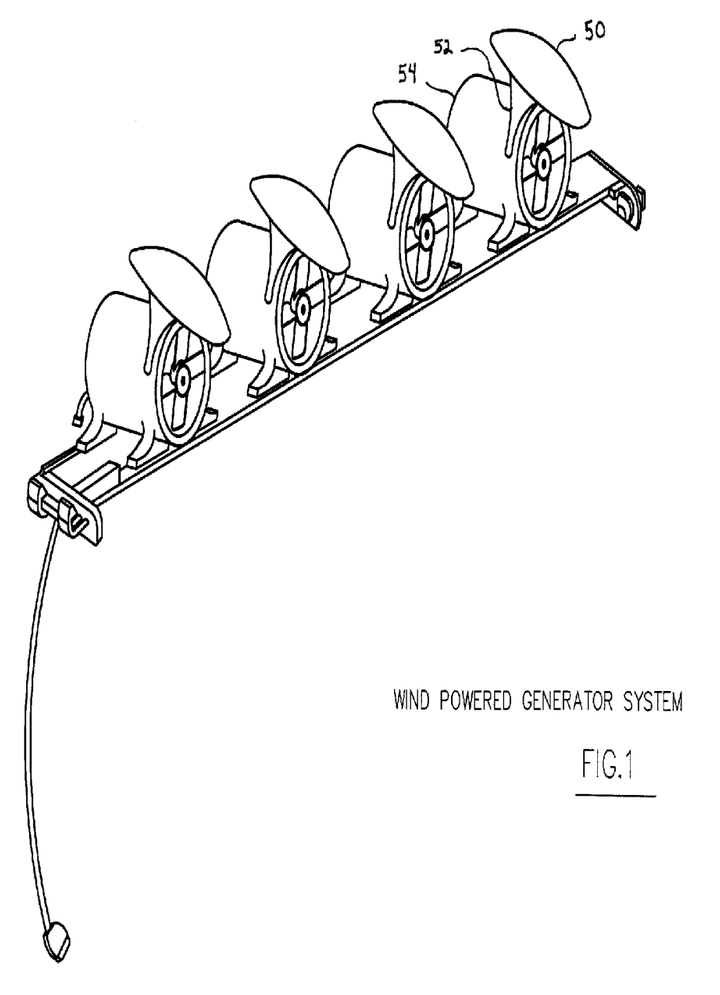
FIG. 1 illustrates the wind powered generator system for roof mounting.

FIG. 1 illustrates the use of multiple generators on the crossbar. These generators can slide into several positions to "stagger" air flow when more than one crossbar is used on vehicle. It also illustrates the use of a protective cover cowling on each turbine fan-generator set used for rain, snow or other. As shown, the cowling 50 is attached by arms 52 to each fan-driven generator set 54. The generators also have an electrical "pigtail" or connector to be snapped in the wiring harness. The wiring harness runs along the base of the crossbar.

Figure 2:
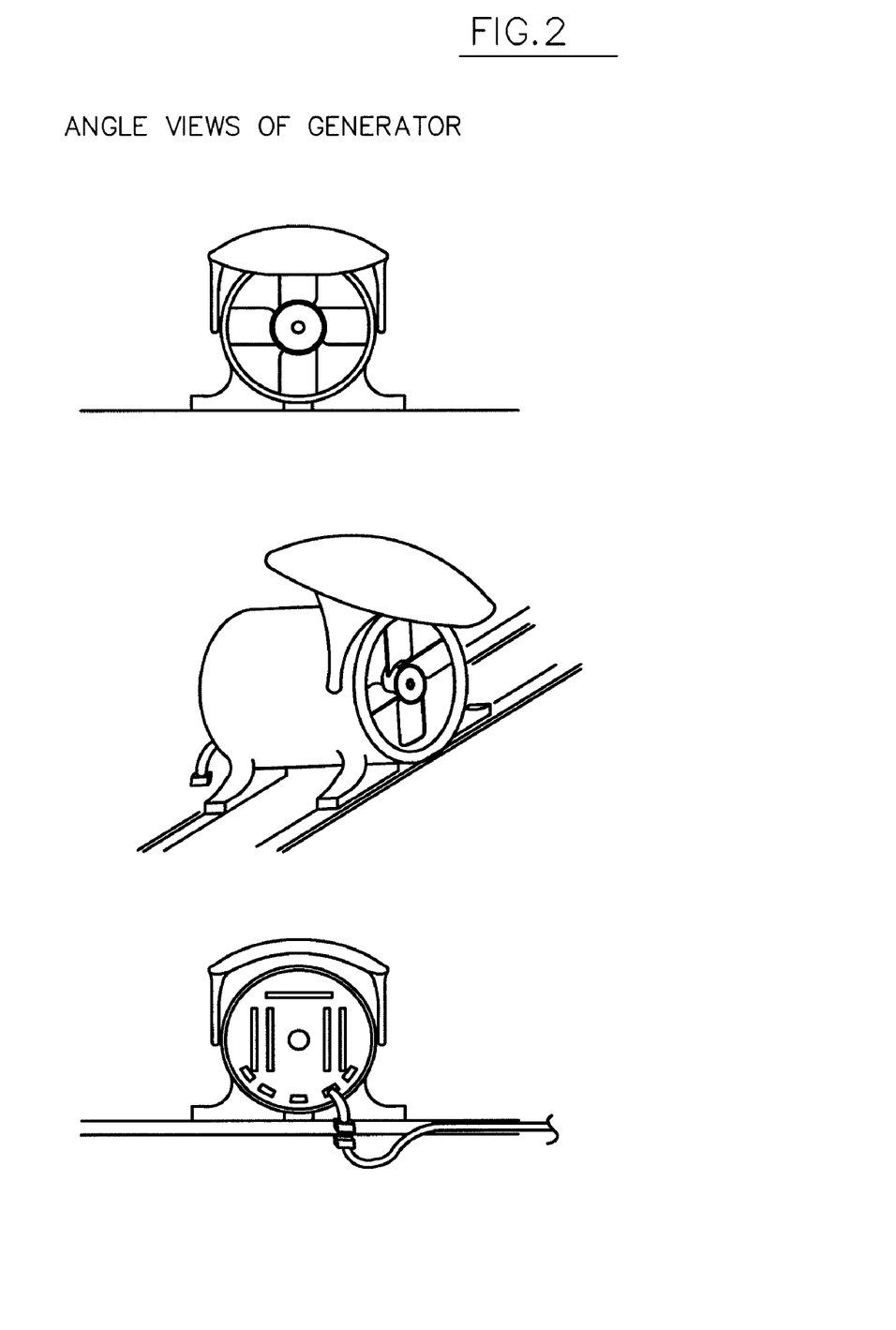
FIG. 2 illustrates three different angles of the wind power generator.

FIG. 2 illustrates three different angles of the generator. The frame or housing of this particular unit requires a plastic material. This will make the unit lighter and easier to relocate. It will also be able to be produced in color(s) of the vehicle(s). The rear frame has ventilation "slots" to handle "air flow" velocity from fan intake area. The front frame and fan intake area is wide enough to place a 4 inch plastic fan that is Electrolux number 5308000010. To protect the fan from outside particles or debris is a wire screen. Then, of course, the protective cover to close over the fan intake area.

Figure 3:
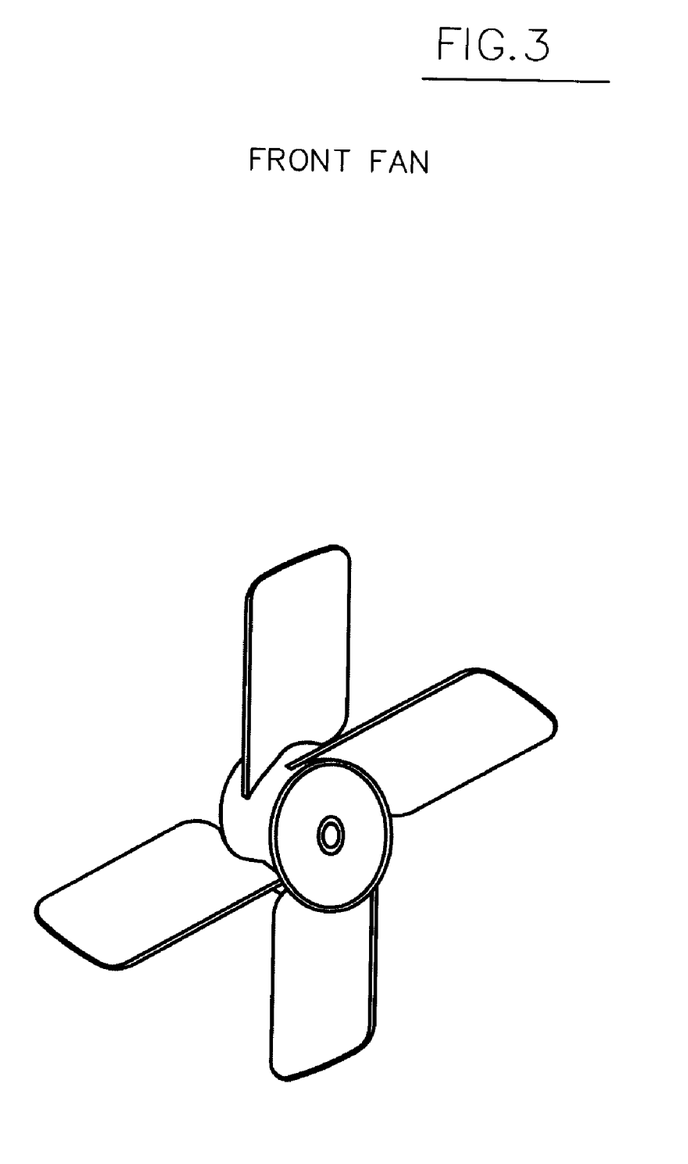
FIG. 3 illustrates the fan blade used on the front of generator unit.

FIG. 3 illustrates the fan blade on the front of generator unit. This fan blade Electrolux SKU part number 5308000010 is 4 inches wide and turns the rotor clockwise to create electrical current.

Figure 4:
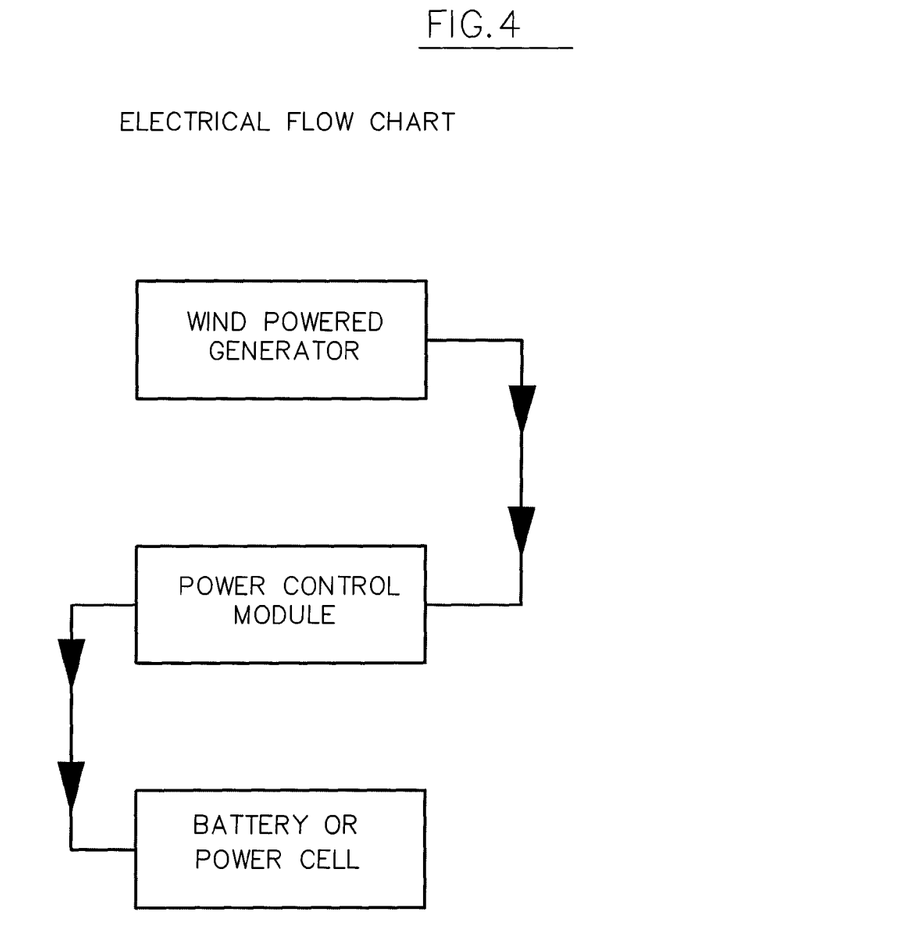
FIG. 4 illustrates a flow chart of the interconnections of components.

FIG. 4 illustrates the flow chart of the interconnection of components. From generator system to power control module to battery or cell. Also, the system is all integrated with a wiring harness.

Figure 5:
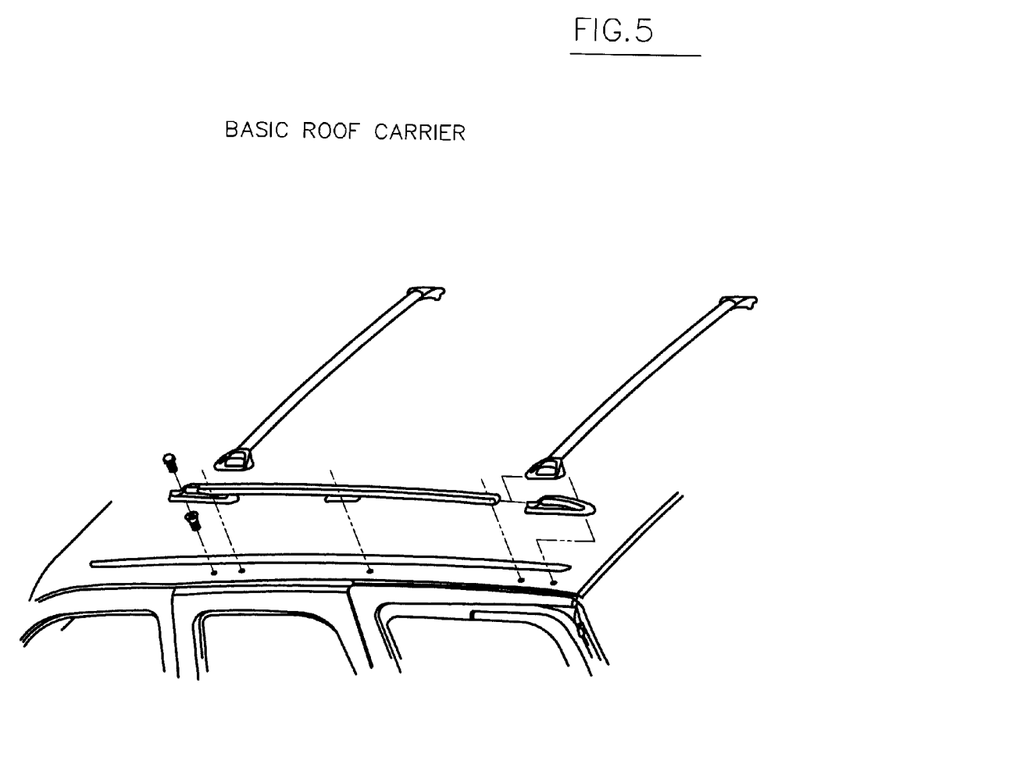
FIG. 5 illustrates the basic roof carrier and mountings located on the roof of vehicle.

FIG. 5 illustrates the basic roof carrier and mountings located on the roof of vehicle. The crossbar or carrier GM number 17801157, are removable, if necessary, and come with a lock and key system. The crossbar could be left on the roof for charging while vehicle is not' in use.

Figure 6:
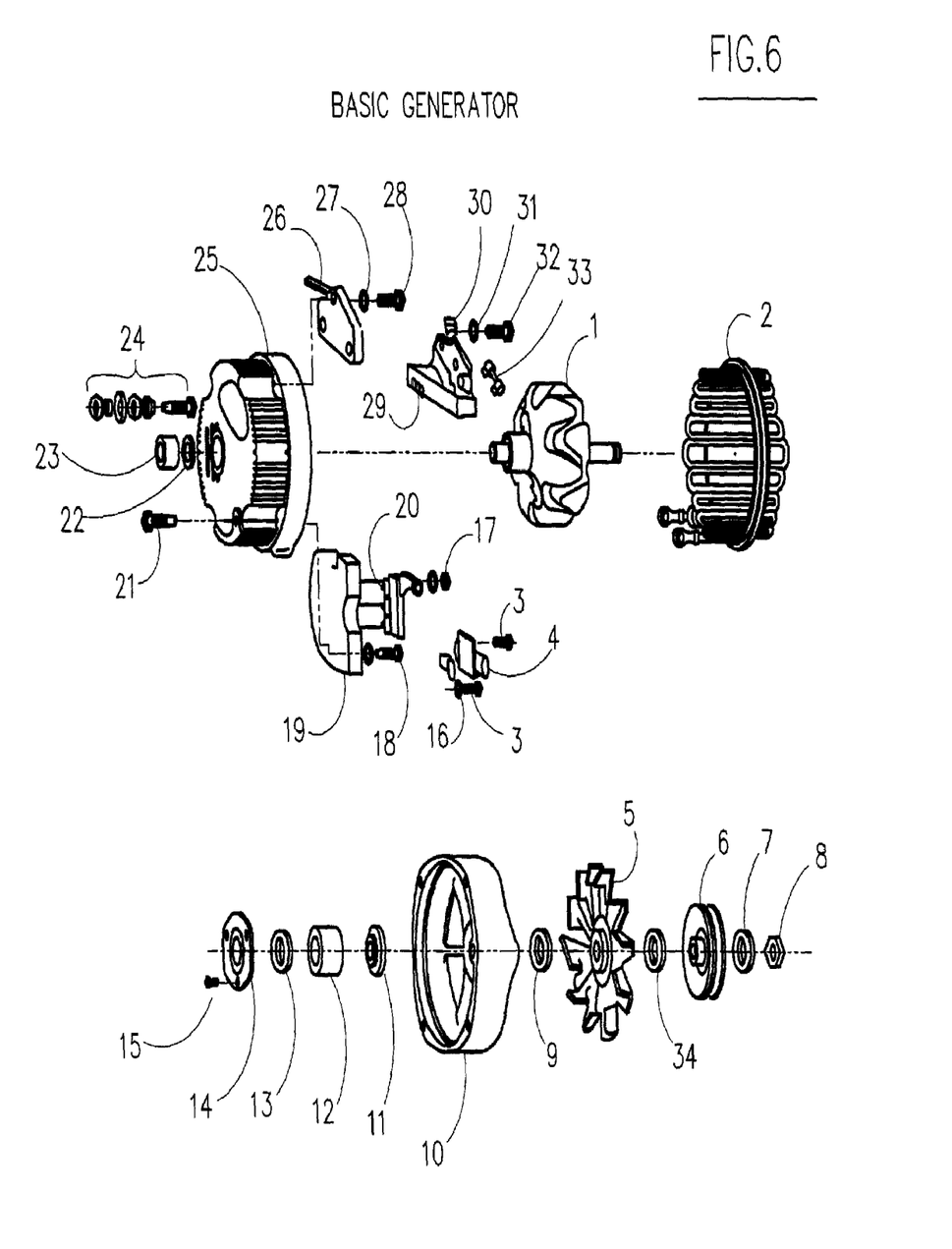
FIG. 6 illustrates a basic breakdown diagram AC-Delco or General Motors 'Delcotron' or generator.

FIG. 6 illustrates a breakdown diagram of a basic AC-Delco or General Motors 'Delcotron' or generator. This diagram encompasses all components of an "Internal Voltage Regulator" style generator. Ford or Motorcraft have made generators with an "External Voltage Regulator". Depending upon usage of system, required voltage, and other variables, both styles could be used. The listing of the AC-Delco or GM part numbers is on the "Generator Components Sheet".

Figure 7:
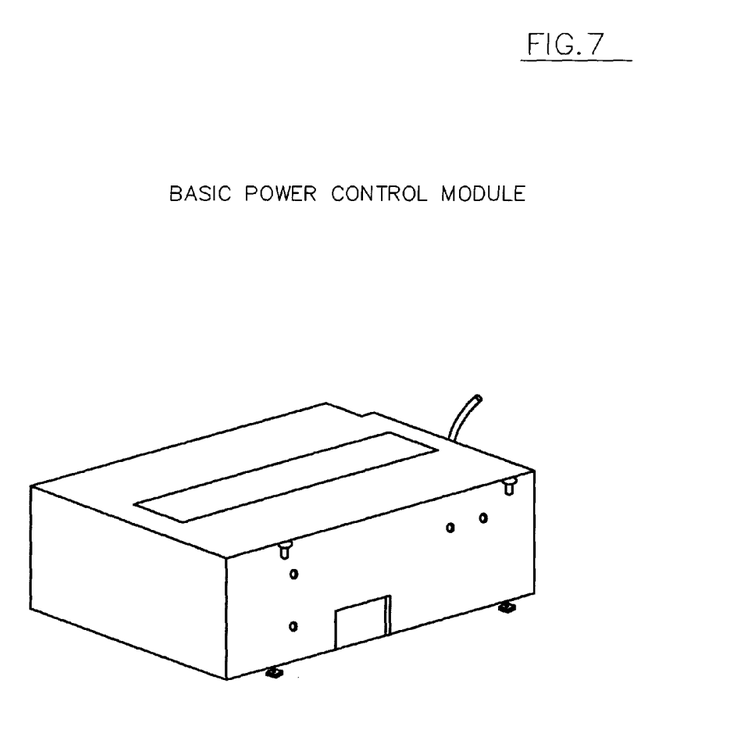
FIG. 7 illustrates a basic General Motors Power Control Module.

FIG. 7 illustrates a basic Power Control Module. As many control modules of today, GM part number 16217058, they are programmable. This module serves as a regulator, inverter, or emergency cut-off. The module controls the input of current to the battery or cell by regulating the output of the generator(s). This module controls the maximum voltage requirement. If the generators used for the system are not for a '12 Volt' system, it also serves as an inverter to 12 Volts. The system can be operated directly from generator system to battery or cell, but in vehicles of the day, there are too many variables not to have some sort of control module.

Figure 8:
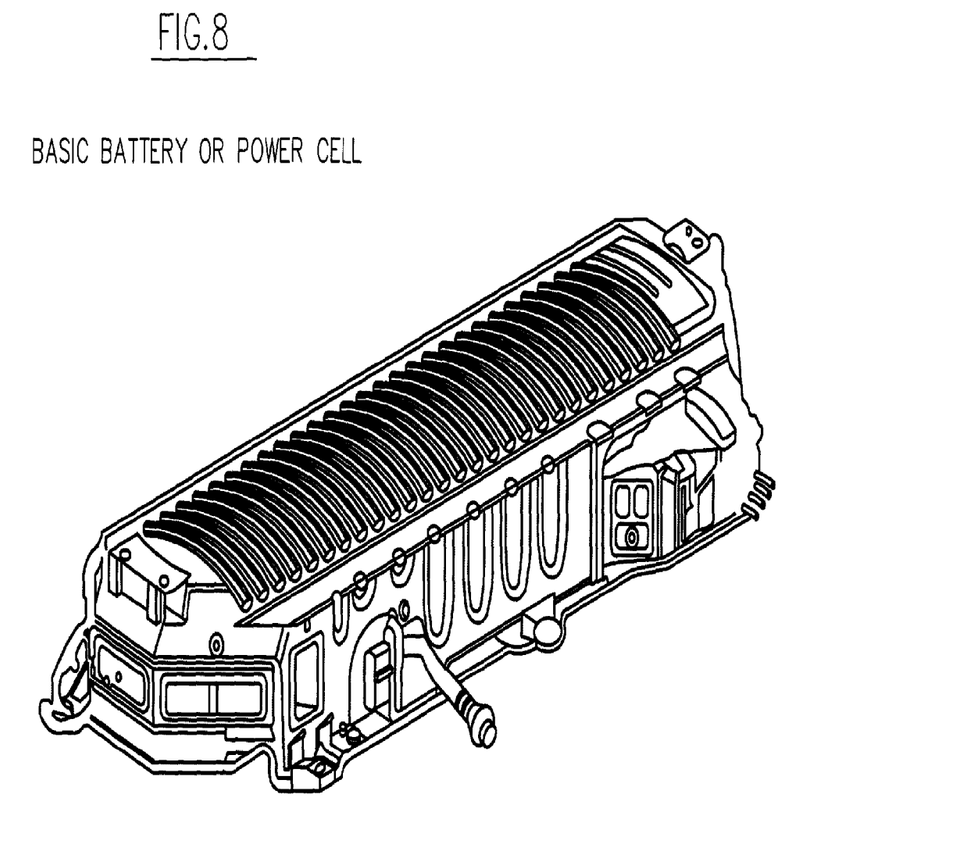
FIG. 8 illustrates a basic General Motors 'Battery or Electronic Cell.

FIG. 8 illustrates a basic General Motors battery or cell, GM part number 19168294. There are many different electric cells, including lithium power cells. Some are called batteries; some are called electric power cells.

SPECIFICATION

The Wind Powered Generator System is a charge and recharging system for Hybrid or Electric vehicles. The system charges the battery or electric cell by air velocity or wind. The system charges while the vehicle is in motion or in a 'Park' position. The typical roof carrier system for vehicles include crossbars. On these crossbars, generators are mounted facing the front of vehicle with a fan blade on the front of the generator. As the vehicle moves forward, the fan blade turns the generators rotor with the wind creating—an electrical current.

Generator Components Sheet

| | | |
|---|---|---|
| 1. | Rotor | GM part number 10475405 |
| 2. | Stator | GM part number 1984584 |
| 3. | Screw | |
| 4. | Capacitor | GM part number 1978146 |
| 5. | Fan | GM part number 1978057 |
| 6. | Pulley | GM part number 10457989 |
| 7. | Washer | GM part number 1941978 |
| 8. | Shaft Nut | GM part number 1911324 |
| 9. | Collar | GM part number 1978520 |
| 10. | Frame | GM part number 1985497 |
| 11. | Slinger | |
| 12. | Bearing | GM part number 12339293 |
| 13. | Collar | GM part number 1978059 |
| 14. | Plate | GM part number 1971993 |
| 15. | Screw | GM part number 1975736 |
| 16. | Washer | |
| 17. | Nut | GM part number 120622 |
| 18. | Screw | GM part number 14058081 |
| 19. | Rectifier | GM part number 1987061 |
| 20. | Diode Trio | GM part number 1985348 |
| 21. | Bolt | GM part number 1956975 |
| 22. | Seal | |
| 23. | Bearing | GM part number 9441879 |
| 24. | Terminal | GM part number 1975471 |
| 25. | Frame | GM part number 1979754 |
| 26. | Regulator | GM part number 1116423 |
| 27. | Washer | |
| 28. | Screw | GM part number 1876682 |
| 29. | Spring | GM part number 1964117 |
| 30. | Brush | GM part number 1984462 |
| 31. | Washer | |
| 32. | Screw | GM part number 1876681 |
| 33. | Resistor | GM part number 830478 |
| 34. | Collar | GM part number 1978064 |

What is claimed is:

1. A wind powered generating system mounted on the roof of a hybrid or an electric powered automotive vehicles having batteries or electric cells comprising:
   a roof rack cross bar carrier adapted to be mounted on the roof of an automobile;
   a series of generators laterally mounted on said crossbar of said roof carrier of said automotive vehicle;
   each generator having an intake and a fan blade at the intake, said fan mounted to the generator rotor;
   a downward slanted cowling above each generator, said cowling having a fore end edge disposed in the path of the air flow through said intake and a rear edge raised above the fore end edge, air velocity causing said fan to rotate and rotating said generator rotor to produce electric current, and said cowling providing a protective cover for each generator protecting against rain, snow and inclement weather; and
   an electric coupling system connecting the generators to said batteries or electric cells.

\* \* \* \* \*